United States Patent [19]
Ueno

[11] 4,273,460
[45] Jun. 16, 1981

[54] AXLE CONSTRUCTION FOR FOUR WHEEL DRIVE VEHICLES OR THE LIKE

[75] Inventor: Mitsuo Ueno, Yokosuka, Japan

[73] Assignee: Nissan Motor Company, Limited, Yokohama, Japan

[21] Appl. No.: 61,803

[22] Filed: Jul. 30, 1979

[30] Foreign Application Priority Data

Aug. 11, 1978 [JP] Japan ............................. 53-109452

[51] Int. Cl.³ .................. B60B 27/00; F16D 1/06
[52] U.S. Cl. .................................. 403/1; 180/247; 192/67 R; 301/132; 301/135
[58] Field of Search ................ 403/1, 365, 259; 192/67 R, 35; 180/247; 301/131, 132, 134, 135

[56] References Cited

U.S. PATENT DOCUMENTS

| | | | |
|---|---|---|---|
| 802,611 | 10/1905 | Van Horn | 301/135 |
| 2,883,025 | 4/1959 | McKim | 192/67 R |
| 3,123,169 | 3/1964 | Young et al. | 180/247 |
| 3,961,827 | 6/1976 | Mankowski et al. | 301/132 |
| 4,043,226 | 8/1977 | Buuck | 180/247 X |

*Primary Examiner*—James Kee Chi
*Attorney, Agent, or Firm*—Thompson, Birch, Gauthier & Samuels

[57] ABSTRACT

A wheel hub has a relatively large diameter hollow spindle within which a hollow shaft member is disposed and supported therein via bearings. A hollow cylindrical sleeve bearing support is disposed within the hollow shaft member and provided with a flange which serves to secure the bearings. The structural strength of the spindle can thus be increased via increasing the diameter thereof without necessitating the enlargement of the diameter of the associated road wheel and/or wheel brake.

2 Claims, 5 Drawing Figures

4,273,460

AXLE CONSTRUCTION FOR FOUR WHEEL DRIVE VEHICLES OR THE LIKE

BACKGROUND OF THE INVENTION

Field of the Invention

The present invention relates to vehicles having multiple sets of driven wheels such as four wheel drive vehicles and more particularly to an axle construction for a vehicle of the type which can be switched between two and four wheel drive.

BRIEF DESCRIPTION OF THE DRAWINGS

The invention will become more clearly understood from the following detailed description taken in connection with the accompanying drawings in which.

DESCRIPTION OF THE PRIOR ART

There are two basic types of four wheel drive vehicles, those which are arranged to have constant four wheel drive and those which can be switched between two and four wheel drive. In the latter type it is common to use free-running hubs on two of the four wheels so that when four wheel drive becomes unnecessary and it is desired to reduce drive resistance and noise generated during full four wheel drive, simple disconnection of the drive to those wheels is possible.

However one prerequisite for the use of such free-running hubs is that a full floating type axle construction be used to permit the connection and disconnection of the wheel from a drive shaft passing through the axle construction.

This type of axle construction has suffered from the drawback that is very difficult to increase the structural strength of the axle beyond given limits without increasing the diameter of the wheel and/or the wheel brakes. This problem will become better understood from the following detailed description of a prior art full floating axle construction shown in FIG. 1 of the drawings.

Figure 1:
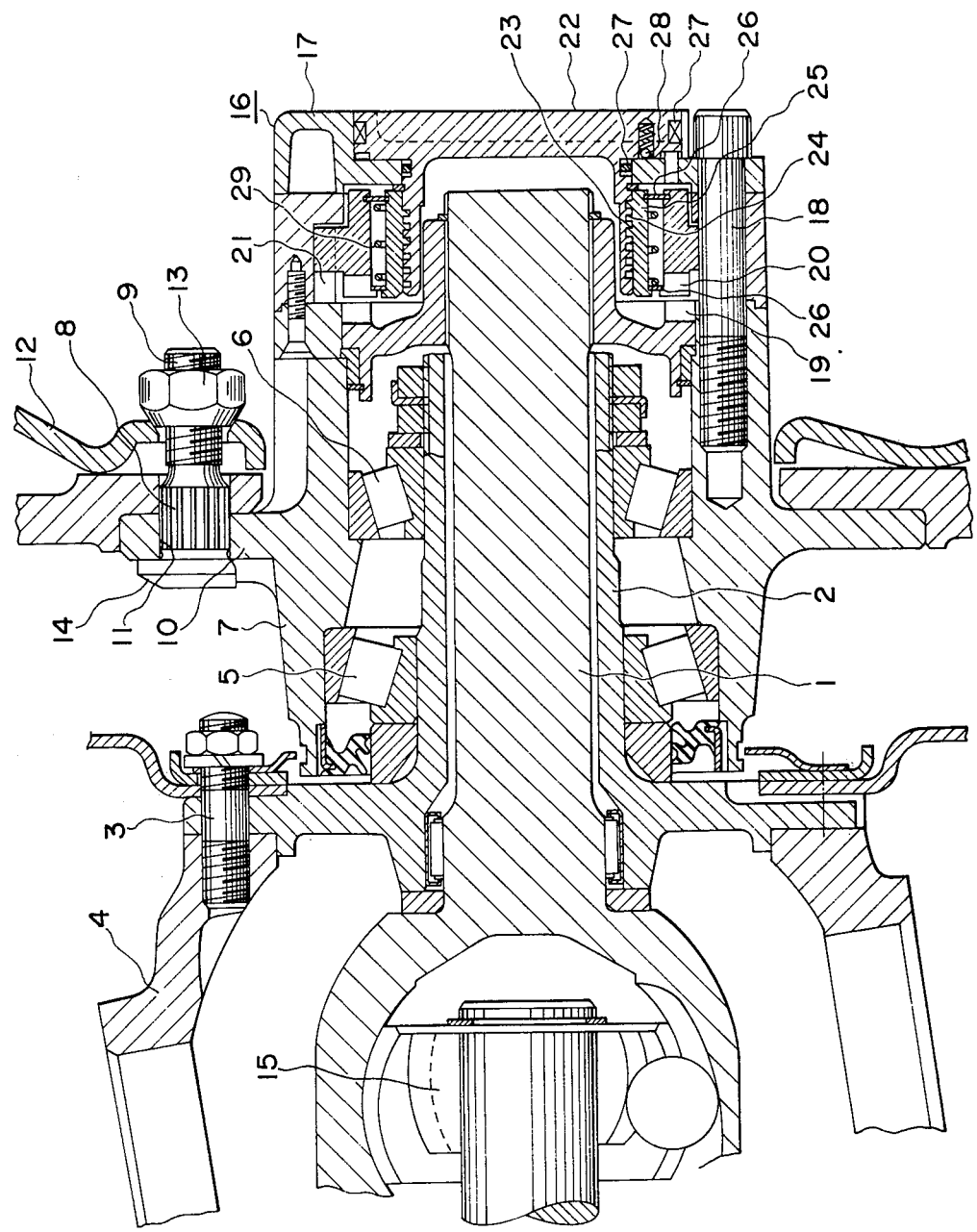
FIG. 1 is a longitudinal cross sectional view of a conventional full-floating type axle construction.

In FIG. 1 the numeral 2 denotes a hollow spindle disposed about an axle or drive shaft 1 which is securely connected to a steering joint or knuckle 4 via bolts 3.

A wheel hub 7 is rotatably supported on an outer surface of the spindle 2 via wheel bearings 5 and 6. Wheel bolts 9 (only one is shown) are formed with serrations or knurlings 8 and are force fitted into holes 11 (only one shown) provided in the flange portion 10 of the wheel hub 7 at equidistantly spaced intervals about the hub. A road wheel 12 is fixed to the hub via nuts 13.

The numeral 15 denotes a universal joint of the drive shaft 1 and the numeral 16 denotes a free running hub. The free running hub 16 has a housing 17 fixed to the wheel hub 7 via bolts 18. Driving clutch teeth 19 and driven clutch teeth 20 are provided in the housing 17 and are arranged to be opposed one and other. The clutch teeth 19 are formed on a member fixedly connected to the end of the drive shaft 1 via splining for synchronous rotation therewith. The clutch teeth 20 on the other hand are arranged to be axially slidable within the hub in response to rotation of a change over knob 22 to permit the teeth 19 and 20 to be brought into mesh or out of mesh when four and two wheel drive respectively, is required.

This axial movement is achieved via the provision of an annular or ring like member 25 formed with an internal helical thread or the like 24 which engages an external thread formed on the knob 22. Connecting rings 26 interconnect the member on which the clutch teeth 20 are formed and the annular member 25 so as to permit mutual rotation therebetween and to move the member on which the clutch teeth 20 are formed axially in response to axial travel of the knob 22. Hence rotation of the knob 22 enables movement of the clutch teeth into mesh or vice versa. Upon meshing of the teeth 19 and 20 the drive shaft 1 is connected to the wheel establishing drive connection therebetween. The numeral 27 indicates an O-ring seal while 28 denotes a click stop.

Now in order to increase the strength of the spindle 2 it is necessary to increase the diameter of same. This of course requires that the diameters of the bearings 5 and 6 and the diameter of the cylindrical portion of the wheel hub 7 be likewise enlarged. However enlarging the diameter of the wheel hub 7 results in the bolt heads 14 of the wheel bolts 9 interfering with the hub, hence making the disposition of the wheel bolts difficult.

One solution to this problem is to increase the diameter of the pitch circle on which the wheel bolts 9 lie. However upon enlarging the pitch circle diameter the space between the wheel bolts 9 and the rim of the road wheel is reduced making it difficult to locate the wheel brake.

Thus, until now it has not been possible to provide a full floating axle having the same structural strength as a normal axle construction given that the diameters of the wheels are the same. This of course in turn requires that in order to produce a four/two wheel drive vehicle which has the same axle strength as a constant four wheel type the diameters of the wheel thereof must be increased. Thus for the production of both types of vehicles two different wheels with differently dimensioned brake parts and the like must be stocked and two different diameter tires be fitted to the wheels; all of which increases the cost of the vehicles.

SUMMARY OF THE INVENTION

It is an object of the present invention to provide a full floating type axle which overcomes all of the drawbacks of the prior art and makes it possible to enlarge the diameter and strength of the spindle without the need for enlarging the diameter of the wheel associated with the axle.

It is thus a feature of the present invention to enable the production of pure or constant four wheel drive vehicles as well as the production of vehicles which can be switched between two and four wheel drive, both vehicles having substantially the same axle strength and the same diameter wheels.

Thus in short, the present invention contemplates disposing a hollow shaft member within a relatively large diameter hollow spindle and disposing bearings therebetween. The bearings are secured in place via a flange of a bearing support which is fitted within the hollow shaft member. This enables the enlargement of the dimensions of the spindle without the corresponding need to enlarge the diameter of the wheel to be carried on the axle construction. Assembly of the arrangement is also very easy as the components may be simply inserted and secured within the hollow spindle from outside of the vehicle.

DETAILED DESCRIPTION OF THE PREFERRED EMBODIMENTS

FIGS. 2 to 5 shown embodiments of an axle construction according to the present invention. In these figures parts similar to or identical with those shown in FIG. 1 are designated by the same reference numerals for ease of comparison and understanding.

Figure 2:
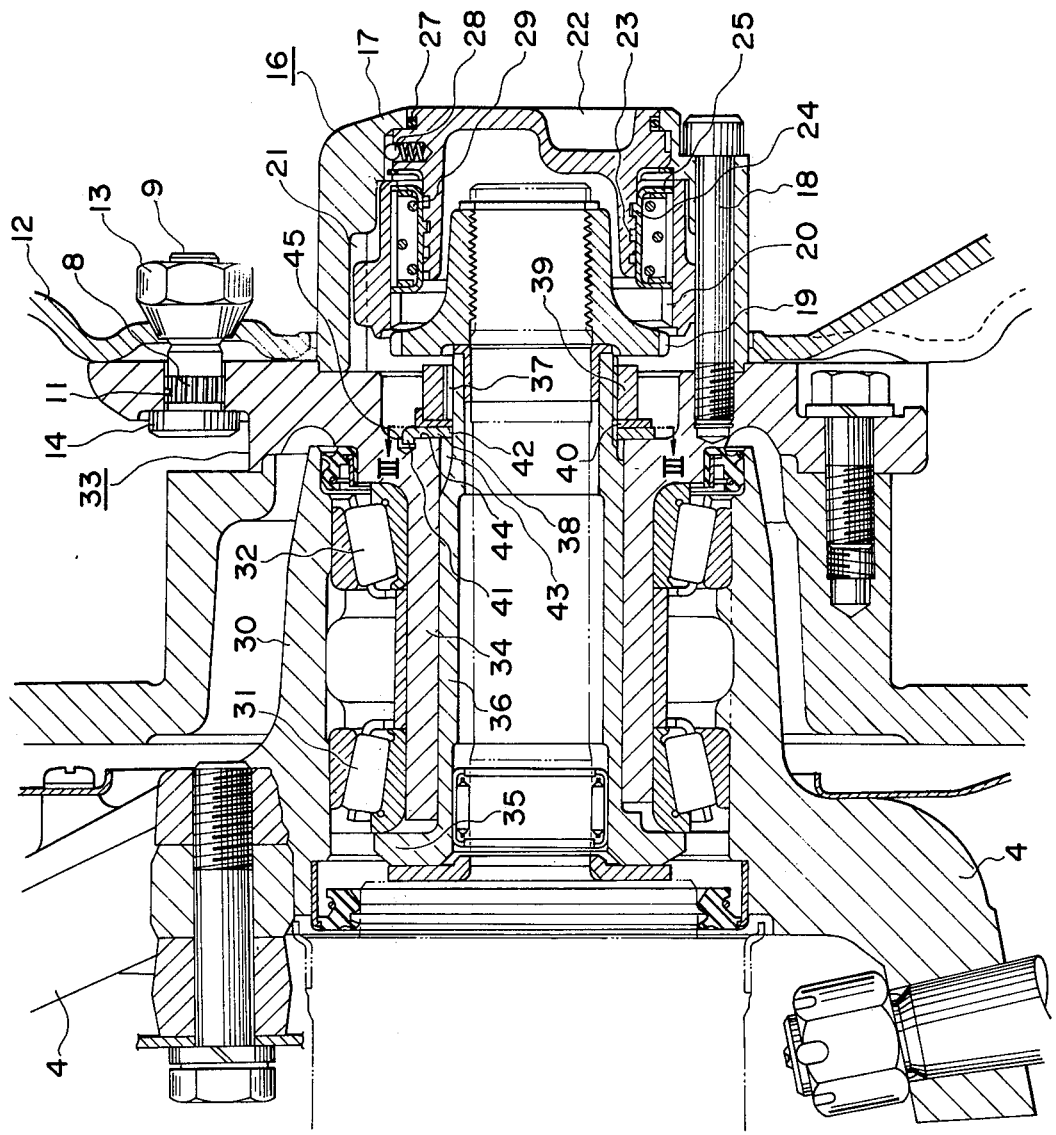
FIG. 2 is a longitudinal cross sectional view of a preferred embodiment of the present invention.

In the embodiment shown in FIG. 2 a hollow spindle 30 (which corresponds to spindle 2 of FIG. 1) is connected to a steering joint or knuckle 4 and has a diameter far greater than that of spindle 2. As shown the knuckle 4 and the spindle 30 are formed integrally.

Unlike the conventional arrangement shown in FIG. 1 the hollow shaft portion 34 of the wheel hub 33 is disposed within the spindle 30 and supported therein via bearings 31 and 32 which in this case are illustrated as being tapered roller bearings. In order to preload the bearings 31 and 32 in the illustrated position a bearing support in the form of a cylindrical sleeve 36 which has a flange 35 formed at one end thereof, is fitted inside the hollow shaft portion 34 of the wheel hub 33 and is arranged to project from the inboard and outboard ends thereof. The drive shaft 1 is disposed through the bearing support so as to be rotatable relative thereto.

A turn stop washer 38 is disposed on the outboard end 37 of the sleeve 36 and held in place via a hub nut 39 threadedly engaged on the outboard end via threads formed thereon. A locking washer 40 is disposed between the hub nut 39 and the turn stop washer 38.

Figure 3:
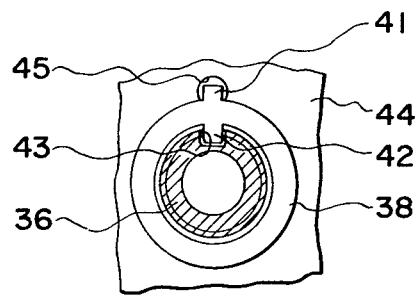
FIG. 3 is a sectional view taken along the section line III—III of FIG. 2.

As shown in FIGS. 2 and 3 the turn stop washer 38 is formed at its outer and inner peripheral surfaces with a radially outwardly extending projection 41 and a a radially inwardly extending projection 42. The projection 42 is, as best seen in FIG. 3 arranged to engage in a latch groove 43 formed in the bearing support (sleeve 36), while the outwardly extending projection 41 is bent, as best seen in FIG. 2, so as to engage in a latch recess 45 formed in an end surface 44 of the wheel hub 33. The projections 41 and 42 prevent the bearing support (sleeve 36) from rotating when the hub nut 39 is screwed onto the threaded end of the sleeve 36 to draw the flange 35 outwardly thus applying a preload to the bearings 31 and 32.

Figure 4:
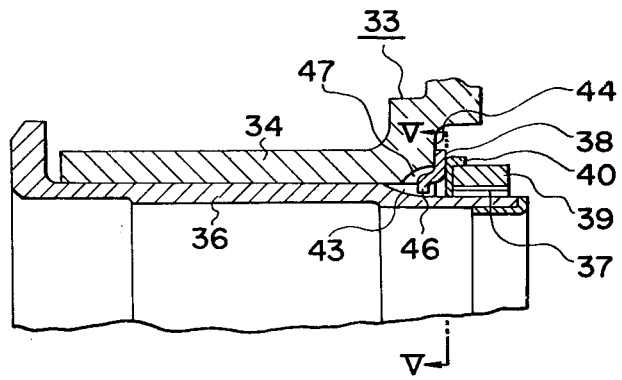
FIG. 4 is a longitudinal cross sectional view of a second embodiment of the present invention.
Figure 5:
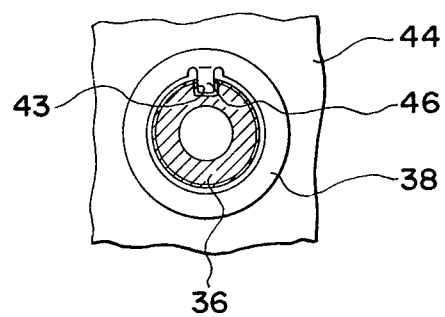
FIG. 5 is a sectional view taken along the section line V—V of FIG. 4.

FIGS. 4 and 5 shown another example of a turn stop washer suitable for use with the present invention. In this case the stop washer takes the form of a plain washer formed by press working, by way of example, which is provided with a single radially inwardly extending projection 46. This projection is bent, as best seen in FIG. 4, to engage in a cavity 47 formed in the end of the wheel hub 33 and simultaneously in a latch groove 43 formed in the bearing support (sleeve 36).

Hence with the present invention, constructed substantially as set forth hereinbefore, the diameter of the hollow spindle can be increased without the need of increasing the diameter of the road wheel and the wheel brake. This of course enables the production of both constant four wheel drive vehicles and those which can be switched between two and four wheel drive via free-running hubs, which use the same wheels. Furthermore since the same diameter wheels can be used the same body panels can also be used since the need to provided different sized wheel arches and/or mud guards is eliminated.

Since the hub nut 39 is readily accessible from outside the vehicle, assembly of the present invention is rendered relatively easy. Assembly is further simplified by the provision of the groove in the bearing support (sleeve 36), the hole or recess in the wheel hub and the turn stop washer having a projection or projections which engage in said recess and groove; the combination of which prevents the rotation of the sleeve 36 while the the hub nut is being tightened in place.

Of course it will be appreciated that the axle construction according to the present invention can be applied to vehicles other than those of the four wheel drive type. For example the same construction may readily be applied to trucks or the like wherein axle strength is of prime importance.

What is claimed is:

1. In a vehicle having multiple sets of driven wheels, an axle construction comprising:
   a drive shaft;
   a hollow spindle disposed coaxially about said drive shaft;
   a wheel hub having a hollow shaft portion, said hollow shaft portion coaxially disposed within said hollow spindle;
   at least one bearing having an inboard end mounted between and rotatably supporting said hollow shaft portion relative to said hollow spindle;
   a free running hub provided between said drive shaft and said wheel hub for providing a selective drive connection therebetween;
   a bearing support having an outboard end, said bearing support fitted within said hollow shaft portion of said wheel hub and spaced from said drive shaft, said bearing support having a flange engageable with said inboard end of said at least one bearing for securing same on said hollow shaft portion;
   a washer fitted on said outboard end of said bearing support and engageable with said wheel hub; and
   a hub nut engaged with said outboard end of said bearing support for retaining said washer on said bearing support.

2. An axle construction as claimed in claim 1, wherein said washer is formed with at least one projection which engages said wheel hub and said bearing support to prevent said bearing support from rotating relative to said wheel hub.

* * * * *